Dec. 7, 1954 G. MACKAS 2,696,105
SIMULATED DEPTH CHARGE SHOCK MACHINE
Filed May 27, 1952
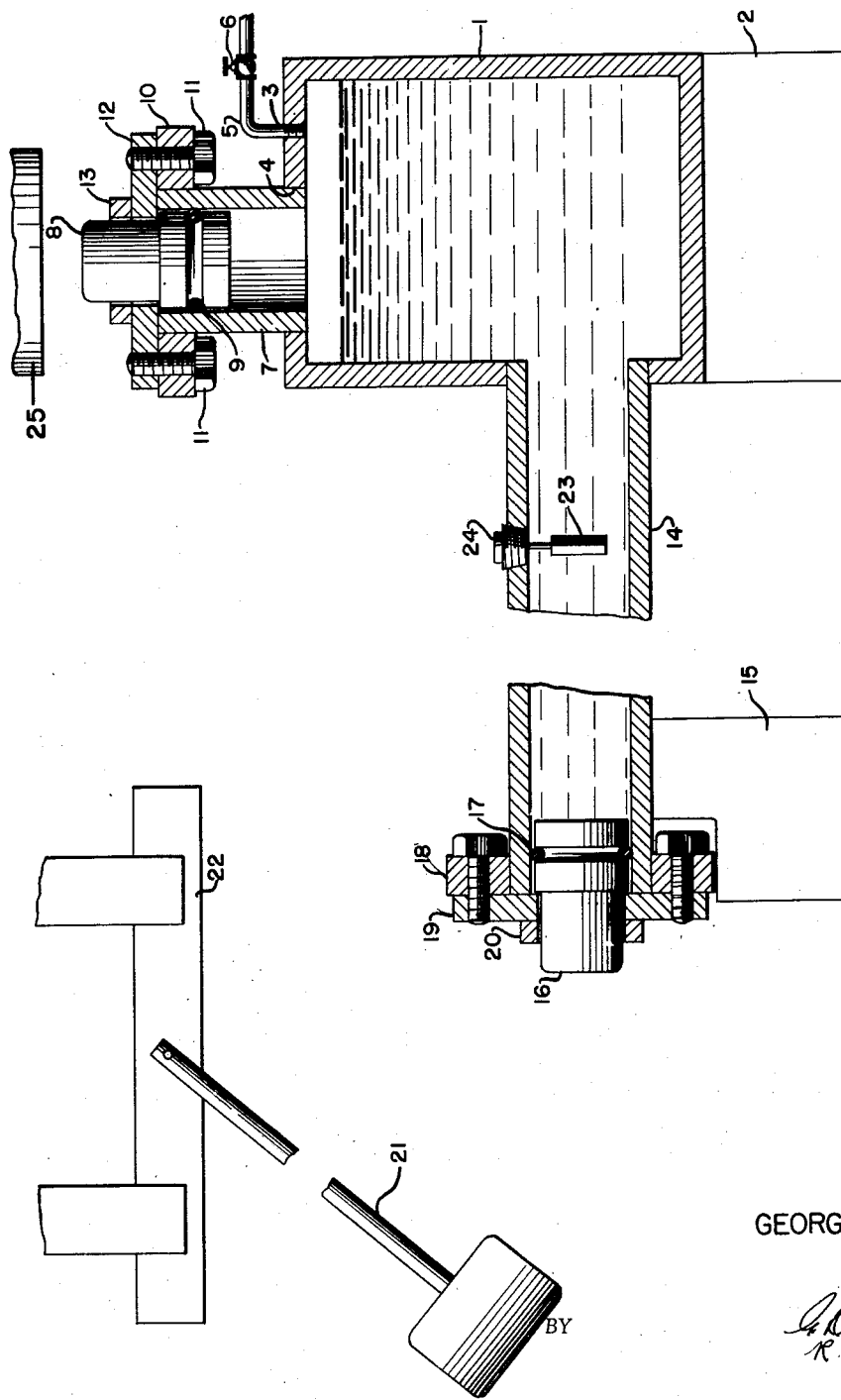
INVENTOR
GEORGE MACKAS
ATTORNEYS 
United States Patent Office 2,696,105
Patented Dec. 7, 1954

2,696,105

SIMULATED DEPTH CHARGE SHOCK MACHINE

George Mackas, Washington, D. C., assignor to the United States of America as represented by the Secretary of the Navy Application May 27, 1952, Serial No. 290,371

3 Claims. (Cl. 73—37)

(Granted under Title 35, U. S. Code (1952), sec. 266)

The invention described herein may be manufactured and used by or for the Government of the United States of America for governmental purposes without the payment of any royalties thereon or therefor.

This invention relates to a shock testing apparatus and more particularly to a means for accurately reproducing the shock and pressure waves caused by underwater explosions.

In underwater explosions there are produced two waves, the first of which is the shock wave characterized by a very steep front and a subsequent exponential decay. The second wave is a pressure wave generated by the first contraction of the gaseous products of the explosion and which is characterized by a comparatively slow rise. In order to design underwater equipment to withstand underwater explosions it is necessary to study the effects of the shock and pressure waves on the equipment, and the methods employed heretofore for this purpose have not been satisfactory for laboratory usage. One prior art method involved actually subjecting the equipment to be tested to an underwater explosion but this method has obvious limitations in that it required much time and material. Another prior art method involved subjecting the equipment to be tested to hydrostatic pressure within a pressure tank but such method was ineffective in that it did not accurately reproduce the steep fronted shock wave characteristic of an underwater explosion.

The present invention utilizes the principle of the water hammer in which a shock wave is developed when the uniform flow of water in a pipe is stopped suddenly by the quick closure of a valve. The kinetic energy of water flow is converted into pressure head the magnitude of which depends on the velocity of the water before valve closure. If the valve closure is rapid enough, the change from kinetic energy to pressure head develops a very steep fronted shock wave that travels up the pipe from the valve with about 4500 ft. per sec. velocity. It is apparent that an object placed in this pipe would be subjected to a shock similar to the shock received in an underwater explosion. In a water hammer the moving column of water strikes a stationary valve. In the present invention a moving piston strikes a stationary column of water to produce the same effect.

The invention disclosed herein provides a water reservoir or tank with a pipe extending horizontally therefrom which has a movable piston mounted in one end thereof. There is also provided a piston slideably mounted in an opening in the upper end of the reservoir. The pipe and reservoir are substantially filled with water and air under high pressure is admitted to the upper end of the reservoir until the pressure in the pipe is equal to the water pressure at the ocean depth which the test is to simulate. A hammer is pivotally mounted adjacent the end of the pipe so that it will strike the movable piston when released. When the hammer is released the piston will move inwardly in the pipe causing a shock wave of a pattern similar to that produced by an underwater explosion and this shock wave travels the length of the pipe. It is apparent therefore that an object placed within the pipe would be subjected to a shock such as it might receive in an underwater explosion. The air pressure within the upper end of the reservoir serves to dissipate the first shock wave and to reduce reflection thereof. In order to reproduce the pressure wave of an underwater explosion any suitable means such as a weight may be mounted above the piston in the upper end of the reservoir so that when the weight is dropped on the piston the piston will move inwardly in the reservoir compressing the air and transmitting a pressure wave to the water. The pressure wave thus created is substantially similar in form to that caused by an underwater explosion. It is apparent therefore that the presently disclosed apparatus provides a means for accurately reproducing the shock wave and the pressure wave caused by an underwater explosion.

An object of the present invention is to provide an apparatus for accurately reproducing the shock and pressure waves caused by an underwater explosion whereby the effects thereof on underwater equipment may be determined.

Another object of this invention is the provision of a testing device for simulating the wave patterns of underwater explosions by utilizing the water hammer principle.

A further object of this invention is to provide a shock testing apparatus in which a steep fronted underwater shock wave is produced by forcing a piston into a water-filled pipe.

Other objects and many of the attendant advantages of this invention will be readily appreciated as the same becomes better understood by reference to the following detailed description when considered in connection with the accompanying drawing wherein:

The figure is a longitudinal sectional view of the present invention.

Referring now to the drawing there is shown a water reservoir or tank 1 which is supported on block 2. The upper end of the reservoir is provided with ports 3 and 4. Mounted within port 3 is a pipe 5 which is connected with any suitable means (not shown) for supplying air at high pressure and which is provided with a valve 6. Secured within port 4 is a pipe section 7 within which is slideably disposed piston 8. Piston 8 is provided with an O-ring seal 9 to insure a leak-proof fitting. An apertured plate 10 is suitably secured to the end portion of pipe section 7 and mounted thereon as by bolts 11 is a guide plate 12. A lead cushion 13 is disposed on plate 12 for a purpose to be presently disclosed.

Mounted within an aperture in the reservoir 1 and extending horizontally outwardly therefrom is a pipe 14 which is supported at its outer end by a block 15. Within the open end of pipe 14 is a slideable piston 16 having O-ring seal 17. A flange plate 18 is mounted on pipe 14 and abuts concrete block 15. Secured to this plate is a guide plate 19 having a lead cushion 20 mounted thereon in any suitable manner. A hammer 21 is pivotally mounted on a bar 22 which is supported from the ceiling or floor in any desired manner. The hammer is mounted so as to strike piston 16 when released from an elevated position.

The operation of the presently disclosed invention will now be described in detail. A specimen 23 to be tested is inserted within pipe 14 through an aperture therein and is supported by plug 24. The pipe 14 and reservoir 1 are substantially filled with water leaving only a small volume of air at the top of reservoir 1. High pressure air is then admitted to the reservoir through pipe 5 until the pressure in pipe 14 is equal to the water pressure at the ocean depth which the test is to simulate. The hammer 21 is then raised and released to strike piston 16 and force the same inwardly in pipe 14. A steep fronted shock wave is thereby created which travels the length of pipe 14 and within reservoir 1 and this wave is absorbed in the air space at the top of reservoir 1 so that reflection of this shock wave is reduced. To determine the effects of the pressure wave following the shock wave in an underwater explosion a weight 25 or other suitable means is released to fall on piston 8 forcing the same inwardly and compressing the high pressure air above the water in reservoir 1. This reaction is transmitted to the water in the form of a pressure wave which is similar to the pressure wave caused by the first contraction of the gases due to an underwater explosion. The cushion 13 is utilized in absorbing excessive energy of the weight, preventing damage to the tank.

It can be seen that in this manner the effects on a specimen of the shock and pressure waves due to an explosion may be accurately determined. By varying the distance of the object 23 from the piston 16 the duration of the shock wave is varied in that the closer the object is to the piston the greater will be the duration of the wave. The height from which hammer 21 is released determines the magnitude of the shock wave and any energy of the hammer not utilized in forcing the piston inwardly is absorbed by the lead cushion. The shape of the shock wave may also be varied by changing the distance the piston extends outwardly of the pipe and by altering the mass of the piston. The greater the mass of the piston the less steep will be the decay of the shock wave. The characteristics of the pressure wave are determined by the mass and velocity of the means employed for forcing piston 8 inwardly. It can be seen therefore that there has been provided a means for accurately reproducing the pressure and shock waves caused by an underwater explosion.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. In a testing device for determining the effects of underwater explosions on submarine equipment, a tank having an opening in the upper end thereof, a pipe having one end thereof secured to said tank, said pipe being in communication with said tank and extending outwardly therefrom, a piston slideably disposed within an end of said pipe, an air filled chamber in the upper end of the tank, a piston slideably disposed within said opening, means for forcing said first-named piston inwardly in said pipe, and means for forcing said second-named piston inwardly in said tank whereby upon substantially filling said pipe and said tank with a liquid shock and pressure waves may be created by the reactions of the moving pistons on the water.

2. A shock testing apparatus comprising, a tank, a pipe having one end thereof secured to the lower portion of said tank, a piston slideably disposed within the open end of said pipe, a piston slideably disposed within an opening in the upper end of said tank, means for admitting air under pressure to the upper portion of said tank, pivotally mounted means for forcing said first-named piston inwardly in said pipe, and means for forcing said second-named piston inwardly in said tank whereby when said pipe and tank are substantially filled with water and air under pressure is admitted to the upper portion of said tank the shock wave and pressure wave caused by an underwater explosion may be simulated by respectively forcing said first-named and said second-named pistons inwardly.

3. A claim according to claim 1 and including means for admitting air under pressure to the upper end of said tank.

References Cited in the file of this patent

UNITED STATES PATENTS

| Number | Name | Date |
|---|---|---|
| 403,676 | Keep | May 21, 1889 |
| 1,909,703 | Moore et al. | May 16, 1933 |
| 2,539,418 | Grogan | Jan. 30, 1951 |